United States Patent [19]
Yamashita et al.

[11] 3,949,061
[45] Apr. 6, 1976

[54] PROCESS FOR OXIDIZING HYDROCYANIC ACID TO CYANOGEN

[75] Inventors: Takeshi Yamashita; Tooru Ide; Sueo Kamada; Takao Kitamura, all of Nobeoka, Japan

[73] Assignee: Asahi Kasei Kogyo Kabushiki Kaisha, Osaka, Japan

[22] Filed: Nov. 2, 1973

[21] Appl. No.: 412,129

[30] Foreign Application Priority Data
Nov. 6, 1972   Japan............................. 47-110233
Feb. 19, 1973  Japan.............................. 48-19289

[52] U.S. Cl. ............................................... 423/384
[51] Int. Cl.² .......................................... C01C 3/00
[58] Field of Search .......... 423/364, 368, 379, 406, 423/384, 435, 414

[56] References Cited
UNITED STATES PATENTS

| | | | |
|---|---|---|---|
| 2,953,435 | 9/1960 | Fierce et al. | 423/384 |
| 3,494,734 | 2/1970 | Nakamura | 423/384 |
| 3,615,192 | 10/1971 | Olivier | 423/384 |
| 3,630,671 | 12/1971 | Block | 423/384 |
| 3,769,388 | 10/1973 | Olivier et al. | 423/384 |

FOREIGN PATENTS OR APPLICATIONS
1,163,302   2/1964   Germany ........................... 423/384

OTHER PUBLICATIONS
Sienko et al., Chemistry, 2nd Edition, 1961, McGraw-Hill Book Company Inc., pp. 497–500.

Primary Examiner—Oscar R. Vertiz
Assistant Examiner—Gary P. Straub
Attorney, Agent, or Firm—Armstrong, Nikaido & Wegner

[57] ABSTRACT

Dicyan is produced by reacting hydrocyanic acid with oxygen or oxygen-containing inert gas in an aqueous solution of copper nitrate or copper nitrate and one or more nitrates of alkali metals, alkaline earth metals or aluminum at a pH of from −0.5 to 1.5. Almost all the small quantity of nitrogen oxides by-produced in the reaction can be removed by absorbing them in the catalyst solution in which the reaction is terminated or retarded and the resulting solution can be reused by recycling.

9 Claims, 1 Drawing Figure

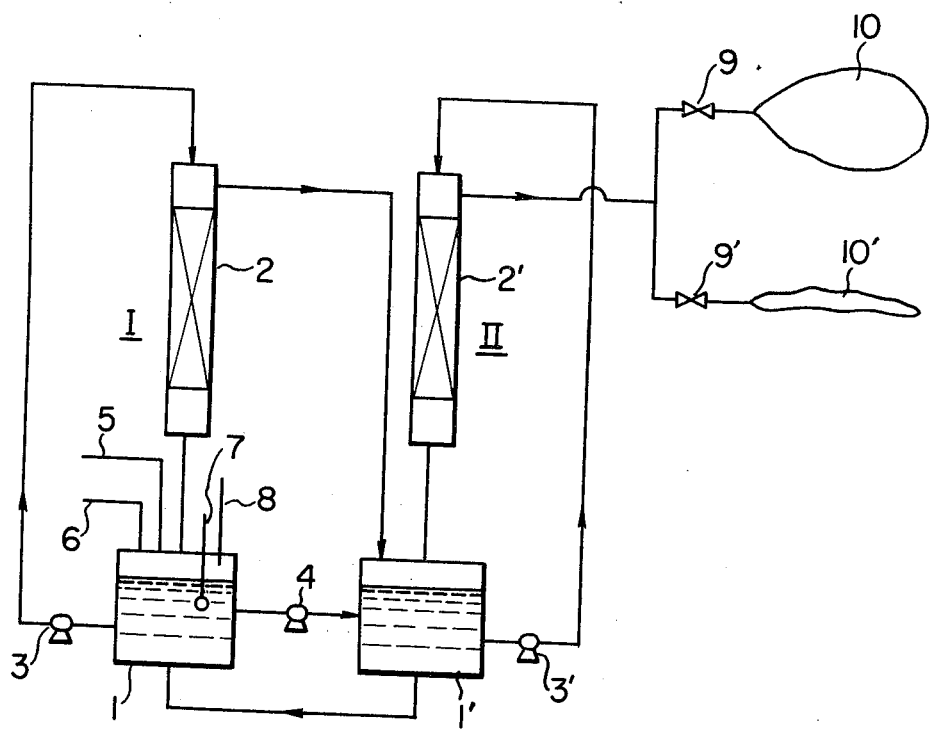

PROCESS FOR OXIDIZING HYDROCYANIC ACID TO CYANOGEN

This invention relates to a process for oxidizing hydrocyanic acid with oxygen in a nitrate solution. More particularly, this invention relates to a process for preparing dicyan with negligible amount of nitrogen oxides by oxidizing hydrocyanic acid with oxygen or oxygen-containing inert gas in a nitrate solution.

Dicyan is a useful compound in organic syntheses, e.g. for preparing oxamide, diiminosuccinonitrile, etc. Dicyan has been prepared by reacting hydrocyanic acid with an oxidizing agent in a vapor phase at relatively high temperatures in the presence of a catalyst or reacting hydrocyanic acid with an oxidizing agent in an aqueous solution of a cupric salt. The former process is not suitable for commercial scale production because of poor yield. The latter process is better than the former, but it has many disadvantages. For example, according to the process disclosed in Japanese Patent Publication Sho No. 43-17289 (17289/1968), dicyan is produced in high yield by reacting hydrocyanic acid with nitrogen dioxide in an aqueous solution of a cupric salt. But this method has such disadvantages as a concentration of dicyan in the produced gases being less than 50% because of the formation of equimolar nitrogen monoxide, additional procedure for separating the produced dicyan being necessary, and the like. Japanese Patent Publication SHO No. 46-5815(5815/1971) discloses such a complicated procedure as absorbing the produced dicyan in a suitable solvent such as acetonitrile, separating the produced nitrogen monoxide which is then oxidized to nitrogen dioxide and using the resulting nitrogen dioxide for oxidizing hydrocyanic acid.

It is an object of the present invention to provide a process for producing dicyan in high concentration directly from hydrocyanic acid without using nitrogen dioxide. Further objects and advantages of this invention will be apparent to one skilled in the art from the accompanying disclosure and discussion.

In accordance with the present invention, dicyan is produced by reacting hydrocyanic acid with oxygen or oxygen-containing inert gas in an aqueous solution of copper nitrate or in an aqueous solution of copper nitrate and one or more nitrates of alkali metals, alkaline earth metals or aluminum, at a pH of from −0.5 to 1.5.

According to the process of the present invention, there are following advantages:

Dicyan can be produced in 82% or more concentration among the output gases and a special separating procedure such as using acetonitrile is not necessary. The data in Table 1 show the superiority of the process of the present invention to that of the conventional process (Japanese Patent Publication Sho No. 43-17289). These reactions can be formulated as follows:

The process of Japanese Patent Publication Sho No. 43-17289;

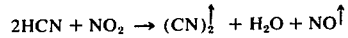

The process of the present invention;

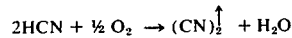

Table 1

|  |  | Process of the present invention | Process of Jap. Pat. Pub. Sho 43-17289 (Example 5) |
|---|---|---|---|
| Starting gases (molar ratio) |  | $HCN:O_2 = 4:1.1$ | $HCN:NO_2 = 2:1$ |
| Catalyst |  | Aqueous solution of copper nitrate | Aqueous solution of copper nitrate |
| Outlet gas Composition (%) | $(CN)_2$ | 82.4 | 44.6 |
|  | $NO_x$ | $NO_2$ 40 | NO 49.3 |
|  | HCN | 3.6 | 1.7 |
|  | $O_2$ | 6.3 | — |
|  | $CO_2$ etc. | 3.7 | 4.4 |

Note) The reaction of the invention was carried out at 25°C and pH o.5 for 1 hour.

Secondly, the addition of a small amount of nitric acid is sufficient for replenishment of nitrate radical during the reaction in order to obtain dicyan in high concentration from hydrocyanic acid and oxygen. In order to obtain dicyan in low concentration, an inert gas containing oxygen in low concentration such as air can be used as an oxidizing agent; this method is very advantageous economically.

Further, when the reaction is carried out in a low concentration of copper nitrate with addition of calcium nitrate and the like, it can be continued more stably for a long time, e.g. 30 hours or more, without forming oxamide. The experimental results in Table 2 show the effect of the addition of calcium nitrate and the like to the catalyst solution.

Table 2

| Catalyst solution |  | Aqueous solution of copper nitrate (0.2 mole/l) | Aqueous solution of calcium nitrate (4 mole/l) and copper nitrate (0.2 mole/l) |
|---|---|---|---|
| Outlet gas composition (%) | $O_2$ | 7.5 | 2.2 |
|  | $N_2$ | 3.8 | 4.5 |
|  | CO | 1.5 | 1.8 |
|  | $CO_2$ | 2.3 | 2.7 |
|  | $(CN)_2$ | 61 | 87 |
|  | HCN | 23 | 0.5 |
|  | NO | 0.5 | 0.6 |
|  | $NO_2$ | 0.3 | 0.4 |

Note) The reaction were carried out using the apparatus shown in the accompanying drawing at 45°C for 100 hours with the molar ratio of HCN to $O_2$ being 4 to 1.1 at a pH of 0 - 0.3.

In addition, since a small amount of nitrogen oxides by-produced can be removed by absorbing them in an aqueous solution of copper nitrate or a mixture of copper nitrate and one or more nitrates of alkali metals, alkaline earth metals or aluminum, dicyan containing only negligible amount of nitrogen oxides can be produced constantly by the reaction, for example, at a temperature of from 45° to 60°C. This effect is very advantageous for industrial production of dicyan. Moreover the thus produced dicyan can be used for preparing oxamide without purification.

These excellent effects of the present invention can be attained by carrying out the reaction preferably under the following conditions.

In order to carry out the reaction stably and continuously at a constant rate, it is necessary to adjust the pH of an aqueous solution of copper nitrate at a pH of from −0.5 to 1.5. When a pH of the catalyst solution is below −0.5, the amount of unreacted hydrocyanic acid increases and when a pH of the catalyst solution is above 1.5, a precipitate begins to form oftenly. When one or more nitrates of alkali metals are added to the copper nitrate solution, it is more preferable to adjust the pH of the solution to 0.5–0.8. When one or more nitrates of alkaline earth metals or aluminum are added to the copper nitrate solution, it is more preferable to adjust the pH of the solution to 0–0.6. The adjustment of pH is necessary due to the pH inherent to the nitrate to be added.

As to the concentration of the catalyst solution, it is effective to use a solution containing 0.5–3 moles of copper nitrate per liter of the solution. When the concentration is less than 0.5 mole per liter, the reaction shows a tendency to become unstable and when it is more than 3 moles per liter, absorption of oxygen begins to decrease.

When the reaction is continued for a long time, it is desirable to add one or more nitrates to the copper nitrate solution. As the nitrates, those of alkali metals, alkaline earth metals and aluminum are used. Examples of these nitrates are sodium nitrate, potassium nitrate, lithium nitrate, magnesium nitrate, calcium nitrate and aluminum nitrate. The use of ammonium nitrate is not preferable because of generation of nitrogen. It is not preferable to use relatively large amount of nitrates of transition metals such as iron, nickel, cobalt and chromium, since ions of these metals may increase the formation of oxamide during the reaction. The higher the concentration of the above-mentioned nitrate, which is added to increase the concentration of the nitrate radical in the catalyst solution, becomes, the more the catalytic activity increases and the more the induction period of the reaction is shortened. Thus the reaction can be carried out in such a low cupric ion concentration as does not affect the reaction rates of hydrocyanic acid. But the solubilities of the nitrates must be taken into the consideration. For example, when the reaction is carried out in a solution of extremely low concentration of copper nitrate (e.g. 0.2 mole/l.), precipitation of cuprous cyanide often takes place. But the addition of the above-mentioned nitrate or nitrates can prevent the solution from the precipitation and conduct the reaction more smoothly. Thus the concentration of the nitrate radical is preferably from 2 moles/l. to the upper limit of the solubility of the nitrate used. In this case, it is preferable to use copper nitrate in a concentration of 0.15–1 mole/l. When the concentration of copper nitrate is extremely high, the formation of oxamide may take place.

The amount of the catalyst solution to the starting materials is not limited particularly, but in order to continue the reaction at a constant rate, for example, 5–50 g/hour of the starting materials are used for 500 ml of the catalyst solution.

Hydrocyanic acid can be used either as a liquid or as a vapor.

As the oxidizing agent, oxygen or oxygen-containing inert gas such as air or a mixture of air and oxygen can be used. When air is used as an oxidizing agent, the concentration of the produced dicyan decreases to about 30% but the concentration of nitrogen oxides (about 1%) and the conversion of hydrocyanic acid are hardly changed. Therefore the use of oxygen, air or a mixture of air and oxygen as an oxidizing agent can be selected freely according to the object of the reaction.

As to the amounts of hydrocyanic acid and oxygen used, stoichiometric amount or more of oxygen may be used. It is preferable to use oxygen in 5–10% excess from economical point of view.

The reaction may preferably be carried out at a temperature of from 10° to 75°C, more preferably from 20° to 60°C. In any case the copper nitrate solution must be kept in a liquid state. When the reaction is carried out at an unnecessarily high temperature, the evolution of nitrogen and carbon dioxide, and the consumption of nitric acid increase unfavorably.

The pressure of the reaction is not limited. Atmospheric pressure or any higher or reduced pressure may be employed in the reaction.

When the crude reaction product is contacted with the catalyst solution in which the reaction is terminated or retarded, almost all the nitrogen oxides produced can be absorbed in the catalyst solution which is recycled for reuse and the desired product can be obtained easily without using any separating procedure.

The process of the present invention is explained in more detail by way of the accompanying drawing which is a schematic flow diagram showing one preferred arrangement of apparatus elements and flow of materials therethrough suitable for practicing the present invention. In the drawing, there are used two reaction apparatus in which reaction apparatus I consists of reactor 1 and packed column 2 and reaction apparatus II consists of reactor 1' and packed column 2'. When the produced nitrogen oxides are removed by absorption in the catalyst solution, two reaction apparatus are used as shown in the drawing. The catalyst solution is placed in reactors 1 and 1' and it is recycled through packed columns 2 and 2' by fixed delivery pumps 3 and 3', respectively. At the same time, the catalyst solutions in reactors 1 and 1' are recycled by fixed delivery pump 4 between the two reactors. Hydrocyanic acid is fed from line 5 and oxygen is fed from line 6 (1.1 times as much as theoretical amount), simultaneously and continuously into reactor 1 and the reaction is carried out. The pH of the catalyst solution in reactor 1 is adjusted by adding nitric acid from line 8 equipped with a solenoid controlled valve which is connected with glass electrode 7. Produced gases rise through packed column 2 contacting with the catalyst solution therein and pass through reactor 1' and packed column 2' wherein the gases are contacted with the catalyst solution again and are collected in collecting bags 10 and 10' through directional control cocks 9 and 9'. By-produced nitrogen oxides are absorbed in the catalyst solution as follows: When a suitable amount of the catalyst solution is recycled through reactors 1 and 1' of the reaction apparatus I and II, the reaction is almost terminated in the catalyst solution in reaction apparatus II. Produced gases in reaction apparatus I containing several percent of nitrogen oxides are contacted with the catalyst solution in packed column 2' of reaction apparatus II wherein the nitrogen oxides are absorbed in the catalyst solution and removed. By the absorption of nitrogen oxides, the pH of the catalyst solution in reaction apparatus II becomes lower than that of the catalyst solution in reaction apparatus I and a stationary state is reached in the catalyst solution in reaction apparatus II wherein the absorption of nitrogen oxides is continued. This procedure is based on the same principle as diluted nitric acid (several percent or less) continues to absorb and remove nitrogen oxides. Thus this procedure is very smart in that dicyan can be obtained in high concentration for ever and nitrogen oxides can always be absorbed and removed by the same catalyst solution. Further, when a part of the catalyst solution in reactor 1 wherein the reaction is not terminated is sent to reactor 2, the reaction is terminated when the catalyst solution sent from reactor 1 is contacted and mixed with that in reactor 2, since the pH of the catalyst solution in reaction apparatus II is lower than that of the catalyst solution in reaction apparatus I. On the other hand, a part of the catalyst solution in reaction apparatus II wherein nitrogen oxides and unreacted hydrocyanic acid are absorbed therein, is sent to reactor 1 by recycling, the pH of it is raised and it begins to oxidize hydrocyanic acid again. The data in Table 2 are obtained by reacting thus at 45° for 100 hours.

When the by-produced nitrogen oxides are not absorbed and removed by the catalyst solution, the reaction may be carried out using reaction apparatus I alone. In that case, the catalyst solution is placed in reactor 1, and it is recycled through packed column 2 by fixed delivery pump 3. The reaction is carried out by feeding hydrocyanic acid and oxygen or air from lines 5 and 6, respectively, continuously and leading the produced gases from the outlet of packed column 2 to cock 9 connected with collecting bag 10. If desired, two or more reaction apparatus similar to reaction apparatus I may be connected in parallel.

The invention is illustrated more particularly by way of the following examples but, as will be more apparent, is not limited to the details thereof.

EXAMPLE 1

Reaction apparatus I and II as shown in the accompanying drawing were used but the connections of lines were slightly changed as follows: reactors 1 and 1' are connected by one line, line connecting reactor 1 and packed column 2 through pump 3 is omitted, line connected with packed column 2' is also connected with packed column 2 at the top of it, each one control cock is placed before the tops of packed columns 2 and 2', outlet of packed column 2 is connected with reactor 1' and upper part of packed column 2' by T-typed line and outlet of packed column 2' is connected with collecting bags 10 and 10' through directional control cocks 9 and 9'. As the reactors 1 and 1', 200-ml separable flasks were used. In each flask, 150 ml of the catalyst solution containing 1.5 moles of copper nitrate per liter of water was placed. The catalyst solution was recycled by pump 3' through each packed columns 2 and 2' (20 mm$\phi$ × 600 mm) at a rate of 120 ml/min. Gaseous hydrocyanic acid was fed from line 5 at a rate of 0.5 mole (13.5 g)/hr and oxygen was fed from line 6 at a rate of 0.14 mole (4.48 g)/hr (1.1 times as much as theoretical amount) and the reaction was carried out at 30°C for 10 hours. During the reaction, 70% nitric acid was added through line 8 equipped with a solenoid controlled valve which is connected with glass electrode 7 in order to maintain the pH of the catalyst solution at 0±0.1. Produced gases were collected with the collecting bags by turns and analyzed by gas chromatography. The results were as follows: dicyan 2.30 moles (119.6 g), unreacted hydrocyanic acid 0.10 mole (2.7 g), oxygen 0.18 mole (5.8 g), $CO_2$ and others 0.10 mole and nitrogen dioxide 0.11 mole (5.1 g). Conversion of hydrocyanic acid (percentage of converted hydrocyanic acid for used hydrocyanic acid) was 98% and yield of dicyan (percentage of obtained dicyan for theoretical amount) was 92%. Concentration of dicyan in the collected gases was 82% and that of nitrogen dioxide was 4%. About 7 ml of 70% nitric acid was consumed for 10 hours to adjust the pH of the catalyst solution.

EXAMPLE 2

Using a procedure similar to that described in Example 1 but changing reaction temperature (20°, 30° or 60°C), pH( −0.5, 0 or 1.5) and concentration of the copper nitrate solution (0.5, 1.5 or 3.0 moles/l) as listed in Table 3, reactions were carried out for 10 hours. The results were as shown in Table 3.

Table 3

| Run No. | 1 | 2 | 3 | 4 | 5 | 6 | 7 |
| --- | --- | --- | --- | --- | --- | --- | --- |
| Reaction temp. (°C) | 30 | 30 | 30 | 20 | 60 | 30 | 30 |
| Concentration of $Cu(NO_3)_2$ 3aq. (mole/l) | 1.5 | 1.5 | 1.5 | 1.5 | 1.5 | 0.5 | 3.0 |
| pH | 0 | −0.5 | 1.5 | 0 | 0 | 0 | 0 |
| Conversion of HCN (%) | 98 | 93 | 99 | 96 | 97 | 90 | 99 |
| Yield of $(CN)_2$ (%) | 92 | 86 | 92 | 88 | 86 | 82 | 91 |
| Concentration of $(CN)_2$ (%) | 82 | 72 | 84 | 76 | 76 | 65 | 83 |
| Concentration of $NO_2$ (%) | 4 | 4 | 4 | 6 | 8 | 7 | 6 |

Note)
Run No. 1 is the result of Example 1. In Run No. 3, pale blue precipitate was formed in the catalyst solution.

EXAMPLE 3

A procedure similar to that described in Example 1 was carried out but 0.14 mole/hr of oxygen was replaced by 0.67 mole/hr of air. The collected gases were 2.29 moles (119.0 g) of dicyan, 0.19 mole (2.7 g) of unreacted hydrocyanic acid, 2.20 mole (6.2 g) of oxygen, 5.3 moles (148.0 g) of nitrogen, 0.11 mole of carbon dioxide and others, and 0.19 mole (8.74 g) of nitrogen dioxide. Conversion of hydrocyanic acid was 98% and yield of dicyan was 92%. Concentration of dicyan in the collected gases was 28% and that of nitrogen dioxide was 2.3%. About 12 ml of 70% nitric acid was consumed for 10 hours to adjust the pH of the catalyst solution.

EXAMPLE 4

Reaction apparatus I alone in the accompanying drawing was used. In a 500-ml separable flask (reactor 1), 250 ml of a mixed catalyst solution containing 2 moles of calcium nitrate and 0.5 mole of copper nitrate per liter of water was placed and it was recycled by fixed delivery pump 3 through packed column 2 (30 mm$\phi$ × 600 mm) at a rate of 150 ml/min. Hydrocyanic acid and oxygen were fed continuously at a rate of 0.8 and 0.22 mole/hr, respectively, (the amount of oxygen being 1.1 times as much as theoretical one) into reactor 1 and the reaction was carried out at 45°C for 20 hours. The produced gases were led from the outlet of packed column 2 to collecting bags 10 and 10' through directional control cocks 9 and 9' by turns. During the reaction, pH of the mixed catalyst solution was maintained at 0.5 by adding 70% nitric acid from line 8 equipped with a solenoid controlled valve which is connected with glass electrode 7. The collected gases were analyzed by gas chromatography and chemical analysis. The results were as follows; conversion of hydrocyanic acid was 97%, yield of dicyan was 91%, concentration of dicyan in the collected gases was 77% and that of nitrogen oxides was 5.5%. 0.075 mole/hr of 70% nitric acid was consumed for adjusting the pH of the catalyst solution.

EXAMPLE 5

Table 4

| Run No. | 1 | 2 | 3 | 4 | 5 | 6 | 7 | 8 | 9 | 10 | 11 | 12 |
|---|---|---|---|---|---|---|---|---|---|---|---|---|
| Reaction temp. (°C) | 45 | 45 | 60 | 20 | 60 | 45 | 45 | 45 | 45 | 45 | 45 | 45 |
| Oxidizing agent | $O_2$ | $O_2$ | air | $O_2$ | $O_2$ | $O_2$ | $O_2$ | $O_2$ | $O_2$ | $O_2$ | $O_2$ | $O_2$ |
| Nitrate | $Ca(NO_3)_2$ ·4aq | $Ca(NO_3)_2$ ·4aq | $Ca(NO_3)_2$ ·4aq | $Ca(NO_3)_2$ ·4aq | $Al(NO_3)_3$ ·9aq | $LiNO_3$ | $NaNO_3$ | $Mg(NO_3)_2$ ·6aq | $KNO_3$ | $Ca(NO_3)_2$·4aq 2 / $NaNO_3$ 2 | — | — |
| (mole/l.) | 2 | 4 | 3.5 | 3.0 | 1.2 | 8.0 | 6.0 | 1.4 | 2.7 | | | |
| Copper nitrate (mole/l.) | 0.5 | 0.15 | 0.3 | 0.2 | 0.3 | 0.15 | 0.2 | 0.3 | 0.4 | 0.3 | 0.5 | 0.15 |
| pH | 0.5 | 0.6 | 0.6 | 0.5 | 0.3 | 0.8 | 0.8 | 0.6 | 0.7 | 0.6 | 0.6 | 0.6 |
| Conversion of HCN (%) | 97 | 97 | 98 | 99.6 | 98 | 99.1 | 99.3 | 96 | 98 | 99.6 | 90 | 83 |
| Yield of $(CN)_2$ (%) | 91 | 91 | 90 | 92 | 91 | 92 | 92 | 91 | 91 | 92 | 83 | 71 |
| Concentration of $(CN)_2$ (%) | 82 | 82 | 29 | 86 | 86 | 86 | 86 | 82 | 86 | 86 | 80 | 65 |
| Concentration of nitrogen oxides (%) | 1.1 | 1.0 | 1.1 | 1.0 | 1.1 | 1.1 | 1.1 | 1.1 | 1.0 | 1.0 | 1.1 | 1.1 |

An apparatus as shown in the accompanying drawing was used. As reactors 1 and 1', each 500-ml separable flask was used. Packed columns 2 and 2' were each 30 mm in diameter and 600 mm in length. In each reactors 1 and 1', 250 ml of a mixed catalyst solution containing 2 moles of calcium nitrate and 0.5 mole of copper nitrate per liter of water was placed and it was recycled by pumps 3 and 3' through packed columns 2 and 2' respectively at a rate of 150 ml/min. At the same time the catalyst solutions in reactors 1 and 1' were recycled by pump 4 between the two reactors at a rate of 200 ml/hr. Gaseous hydrocyanic acid was fed from line 5 at a rate of 0.8 mole/hr and oxygen was fed from line 6 at a rate of 0.22 mole/hr (1.1 times as much as theoretical amount), continuously into reactor 1 and the reaction was carried out at 45°C for 400 hours. During the reaction, the pH of the catalyst solution in reactor 1 was maintained at 0.5 by adding 70% nitric acid from line 8 equipped with a solenoid controlled valve which is connected with glass electrode 7. Produced gases were collected by collecting bags 10 and 10' by turns and analyzed by gas chromatography and chemical analysis. The results were as follows; conversion of hydrocyanic acid was 97%, yield of dicyan was 91%, concentration of dicyan in the collected gases was 82% and that of nitrogen oxides was 1.1%. No precipitate such as oxamide and others was admitted. 0.035 mole/hr of 70% nitric acid was consumed for adjusting the pH of the catalyst solution. The pH of the catalyst solution in reaction apparatus II was −0.8 and was stable.

EXAMPLE 6

Using a procedure similar to that described in Example 5 but changing reaction temperature (20°, 45° or 60°C), kind and concentration of nitrate to be added and oxidizing agent as listed in Table 4, reactions were carried out for 400 hours. The results were as shown in Table 4. In Table 4, Run No. 1 is the result of Example 5. In Run Nos. 11 and 12, only copper nitrate was used for comparison. In the all reactions, there was no deposition of oxamide.

What is claimed is:

1. A process for producing dicyan which comprises reacting hydrocyanic acid with oxygen or oxygen containing inert gas in an aqueous solution of copper nitrate at a pH of from −0.5 to +1.5 adjusted with nitric acid and at a temperature of from 10° to 75°C.

2. A process according to claim 1, wherein the aqueous solution of copper nitrate contains one or more nitrates of alkali metals, alkaline earth metals or aluminum.

3. A process according to claim 1, wherein the concentration of the copper nitrate solution is 0.5–3 mole/l.

4. A process according to claim 2, wherein the reaction is carried out at a pH of from 0.5 to 0.8 using an aqueous solution of copper nitrate and one or more nitrates of alkali metals.

5. A process according to claim 2, wherein the reaction is carried out at a pH of from 0 to 0.6 using an aqueous solution of copper nitrate and one or more nitrates of alkaline earth metals or aluminum.

6. A process according to claim 2, wherein the aqueous solution contains 0.15–1 mole/l of copper nitrate and from 2 mole/l to the upper limit of solubility of the nitrate radical or radicals of one or more nitrates of alkali metals, alkaline earth metals or aluminum.

7. A process according to claim 1, wherein the generated nitrogen oxides are absorbed by the aqueous solution of copper nitrate in which the reaction is terminated or retarded and the resulting solution is reused by recycling.

8. A process according to claim 2, wherein the generated nitrogen oxides are absorbed by the aqueous solution of copper nitrate and one or more nitrates of alkali metals, alkaline earth metals or aluminum in which the reaction is terminated or retarded and the resulting solution is reused by recycling.

9. A process according to claim 1, wherein oxygen is used.

* * * * *